United States Patent [19]

Miyamoto et al.

[11] Patent Number: 5,652,708

[45] Date of Patent: Jul. 29, 1997

[54] METHOD FOR ASSESSING ENVIRONMENTAL IMPACT OF MANUFACTURE AND DISPOSAL OF PRODUCT

[75] Inventors: Shigeyuki Miyamoto; Ryosuke Ugo, both of Tokyo, Japan

[73] Assignee: NEC Corporation, Tokyo, Japan

[21] Appl. No.: 443,310

[22] Filed: May 17, 1995

[30] Foreign Application Priority Data

May 17, 1994 [JP] Japan .................................. 6-102410

[51] Int. Cl.$^6$ .............................. G06F 19/00; G06G 7/64; G06G 7/66
[52] U.S. Cl. ...................... 364/468.13; 364/420
[58] Field of Search ........................ 364/468, 468.13, 364/420, 400–409; 422/900

[56] References Cited

U.S. PATENT DOCUMENTS 5,311,437  5/1994  Leal et al. .................... 364/468

OTHER PUBLICATIONS

"Present Condition of LCA in Japan and Problems in the Future"; Ecomaterials Forum, 1994; pp. 30–34.

*Primary Examiner*—Paul P. Gordon
*Assistant Examiner*—Robert J. Dolan
*Attorney, Agent, or Firm*—Whitham, Curtis, Whitham & McGinn

[57] ABSTRACT

The life cycle of a product is divided into plurality of assessment steps. The assessment steps are structured so as to have a tree structure defining a product as a root and each assessment step as a branch extending from the root. For each assessment step, environmental loadings are assessed.

7 Claims, 6 Drawing Sheets

FIG.4

| NAME OF PRODUCT |
|---|
| PRODUCT INFORMATION 1 |
| - - - |
| PRODUCT INFORMATION 1 |
| RAW MATERIAL 1 |
| - - - |
| RAW MATERIAL m |
| ENVIRONMENTAL LOADING 1 |
| - - - |
| ENVIRONMENTAL LOADING n |
| ENVIRONMENTAL LOADING VALUE 1 |
| - - - |
| ENVIRONMENTAL LOADING VALUE n |

FIG.5

| NAME OF PRODUCT |
|---|
| PRODUCT INFORMATION 1 |
| - - - |
| PRODUCT INFORMATION 1 |
| BREAKDOWN 1 |
| - - - |
| BREAKDOWN m |
| ENVIRONMENTAL LOADING 1 |
| - - - |
| ENVIRONMENTAL LOADING n |
| ENVIRONMENTAL LOADING VALUE 1 |
| - - - |
| ENVIRONMENTAL LOADING VALUE n |

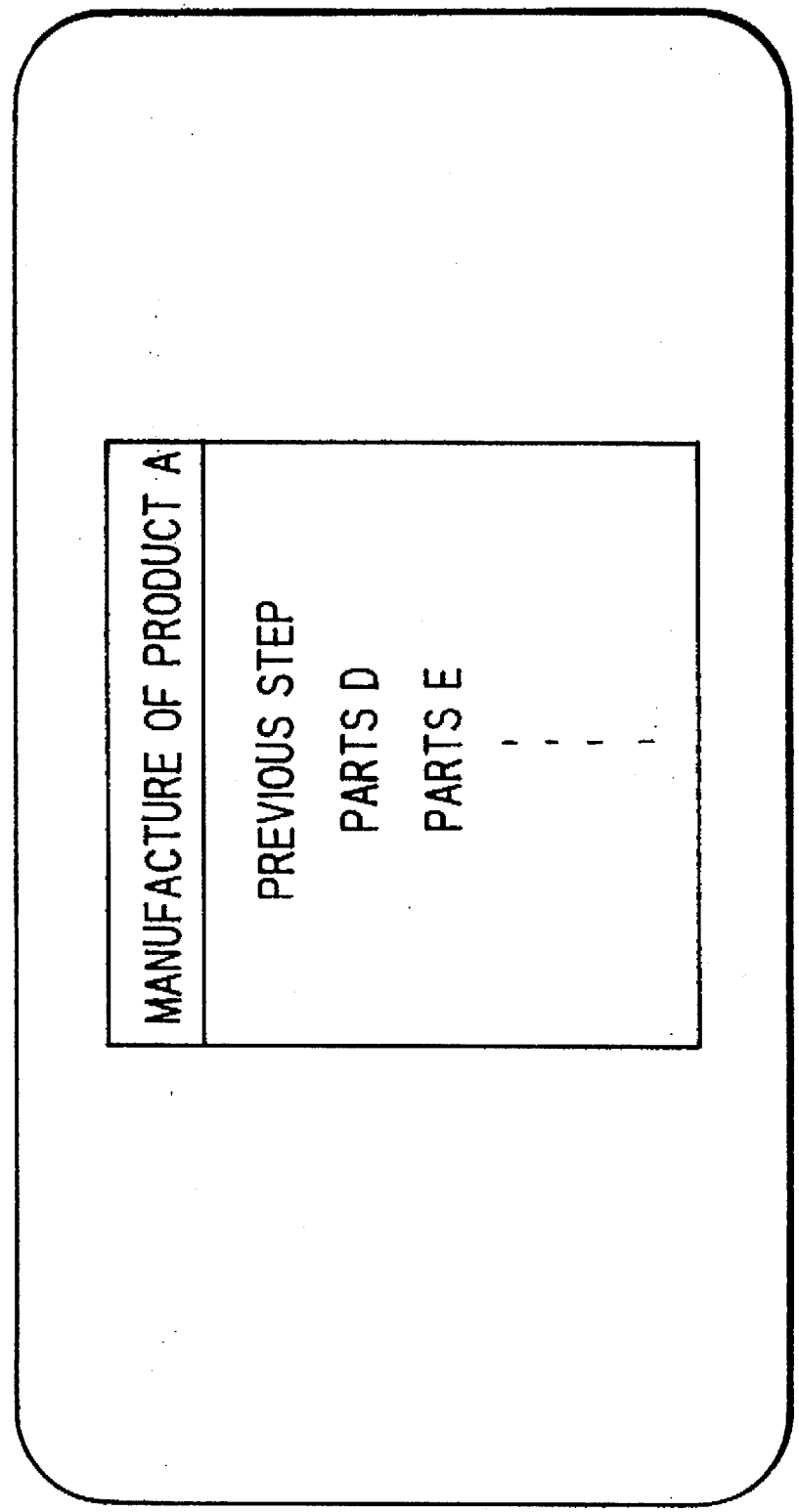

5,652,708

METHOD FOR ASSESSING ENVIRONMENTAL IMPACT OF MANUFACTURE AND DISPOSAL OF PRODUCT

FIELD OF THE INVENTION

The invention relates to a method for assessing total environmental impact of manufacture and disposal of a product.

BACKGROUND OF THE INVENTION

In a conventional assessment of environmental impact of manufacture and disposal of a product, some specific steps for manufacturing and disposal are picked up to be assessed by detecting injurious substances and the quantity thereof. It is difficult to employ the above mentioned conventional method to assesses impact on environment precisely when, for example, a very small amount of carbon dioxide is detected in each assessment step in contrast with the large amount of the total carbon dioxide detected from the whole assessment steps. Accordingly, an LCA (Life Cycle Assessment) has been studied, in which environmental impact is assessed quantitatively during processing of manufacture through disposal of a product, as described in report "Present Condition of LCA in Japan and Problems in the Future" 1994 by Ecomaterials Forum.

In a conventional method, the life cycle of a product is divided into some steps arranged in series. It is difficult to assess the impact on the environment of complicated manufacture and disposal of a product, which is composed of a large number of parts, such as electrical and mechanical devices. Usually, each step of the life cycle of a product is not defined clearly; and therefore, it is difficult to assess the impact of manufacture and disposal of a product on the environment precisely.

SUMMARY OF THE INVENTION

Accordingly, an object of the invention is to provide an improved method for assessing environmental impact of manufacture and disposal of a product, by which the assessment can be carried out efficiently and precisely.

According to an aspect of the invention, in a method for assessing environmental impact of manufacture and disposal of a product, the process for manufacturing a product is structured so as to define the product as a root and each assessment process for manufacturing the product as a branch of the root. At the same time, the assessment process for disposing the product is structured so as to define the product as a root and each assessment process for disposing the product as a branch of the root, as well. Environmental impact of each assessment process is assessed, and then the total environmental impact is calculated.

BRIEF DESCRIPTION OF THE DRAWINGS

FIG. 4 is a conceptual diagram showing the data format of the an assessment process, according to the invention.

FIG. 5 is a conceptual diagram showing the data format of the an assessment process, according to the invention.

FIG. 7 is an explanatory diagram showing an example of output display, according to the invention.

DESCRIPTION OF THE PREFERRED EMBODIMENTS

Figure 1:
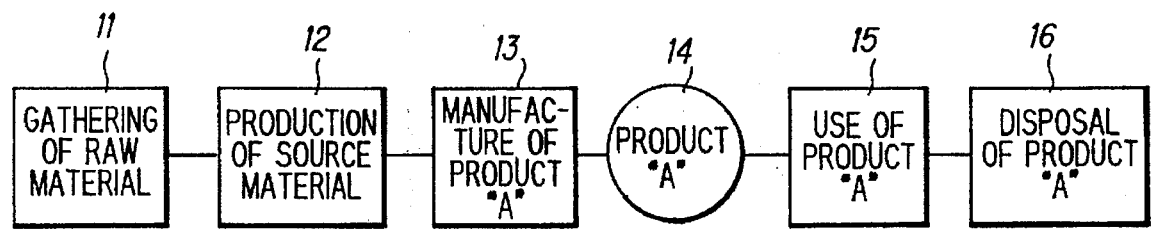
FIG. 1 is a block diagram showing an assessment process used for assessing environmental impact of manufacture and disposal of a product, according to a conventional technology.

For better understanding of the invention, a conventional technology shown in FIG. 1 is first described. The conventional method for assessing environmental impact of manufacture end disposal of a complete product A includes an assessment process of gathering raw material (11), producing source material from the raw material (12), manufacturing a complete product A (13), using the complete product A, and disposing the complete product A. In each assessment process, environmental impact (environmental loading) is detected, and then the total of each load level is calculated.

Figure 2:
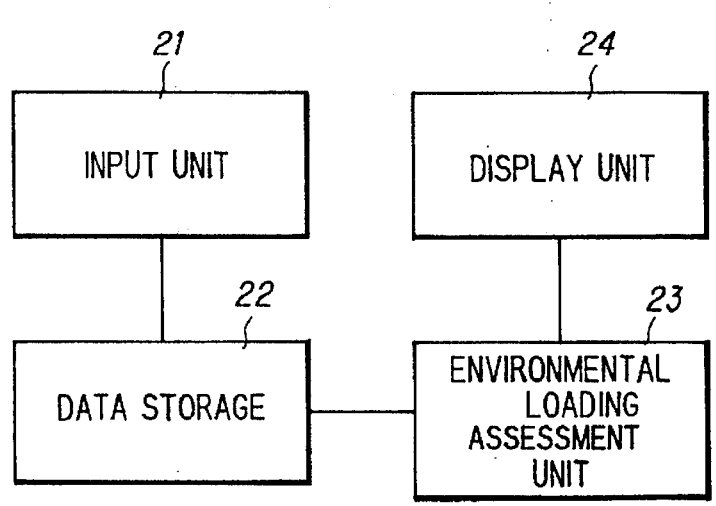
FIG. 2 is a block diagram illustrating a system used for assessing environmental impact of manufacture and disposal of a product, according to the invention.

FIG. 2 shows a computer system used for a method for assessing environmental impact of manufacture and disposal of a product according to the invention, which includes an input unit 21, a data storage 22 connected to the input unit 21, an environmental impact assessment unit 23 connected to the data storage 22 and a display unit 24 connected to the environmental impact assessment unit 23.

The input unit 21 may be a keyboard, a mouse, and so on, which is used for inputting the contents of each assessment process, the relation between the assessment process, an environmental value of each assessment process, etc. The data storage 22 may be a magnetic disk, an optical magnetic disk, and so on, which stores data supplied from the input unit 21. The environmental impact assessment unit 23 may be an arithmetic device, which calculates the total of environmental impact for each assessment process. The display unit 24 may be a CRT, a printer, and so on, which indicates the input data from the input unit 21, and output data, which is the total of environmental impact calculated by the environmental impact assessment unit 23.

Figure 3:
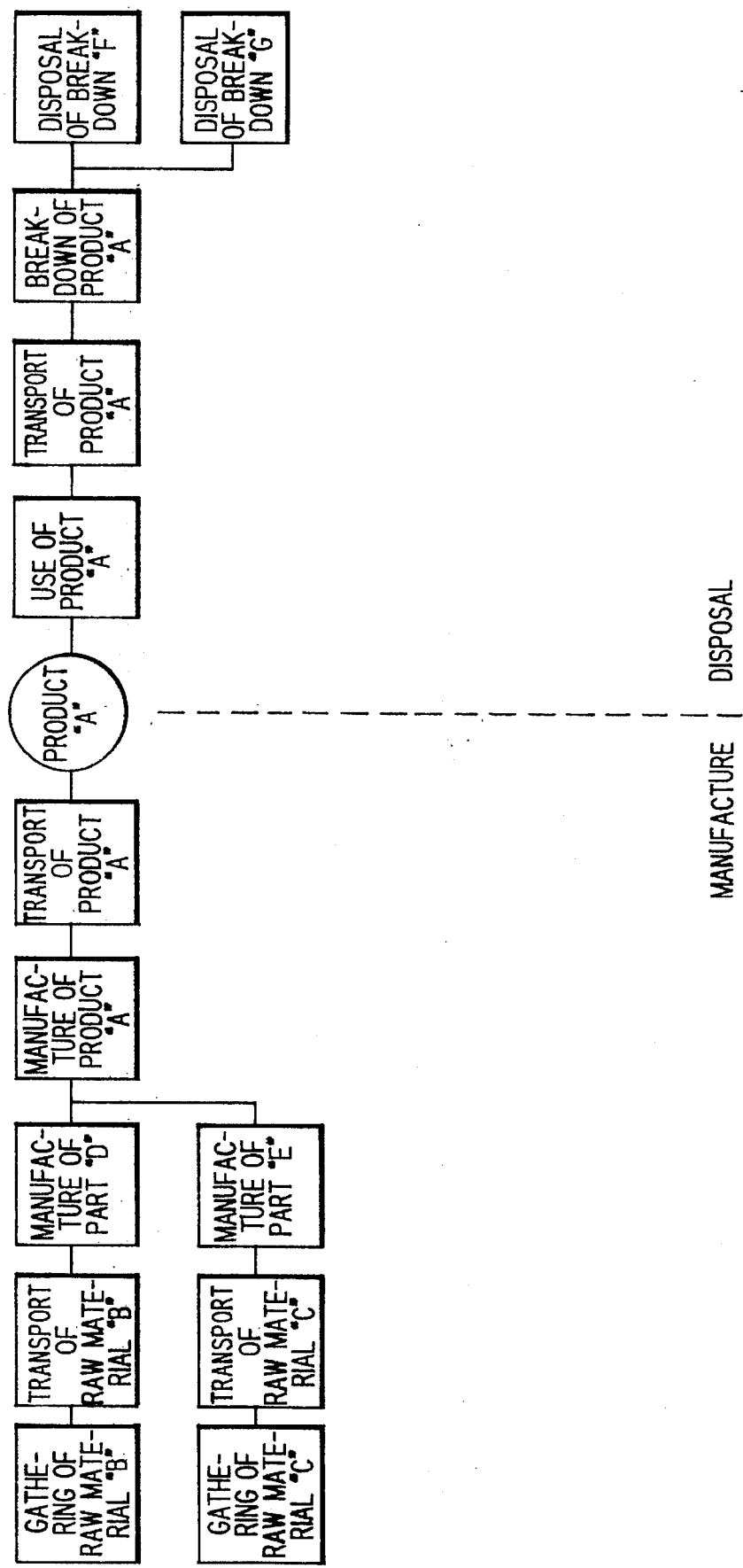
FIG. 3 is a block diagram illustrating an assessment process used for assessing environmental impact of manufacture and disposal of a product, according to the invention.

In this embodiment, the life cycle of a product is structured so as to have a tree structure with a root of a product A and branches extending from the root. The life cycle is divided into manufacture and disposal sides, in which each side is divided into a plurality of an assessment process shown in FIG. 3.

In the manufacture side, the product A is made of two different kinds of parts D and E, which are made from two different kinds of raw material B and C, respectively. In the disposal side, the product A is broken down into breakdown matters F and G to be disposed. In each assessment process, environmental loadings is detected or a predetermined value are applied as environmental impact, and then, the total of environmental impact is calculated. In this embodiment, the assessment process in the manufacture side corresponds to a manufacturing process and each assessment step is independent from each other, so that environmental impact can be obtained precisely.

FIG. 4 shows an example of data format of the data storage 22 for information in the manufacture side, in which a product is made of "m" different kinds of raw material. The data include a name of a product, a piece of information on the product, names of "m" kinds of material, "n" number of assessment processes and "n " number of environmental impact values. The information on the product is a kind of additional information including the number of products, the unit thereof, weight, volume, etc. In addition, date of the information, the name of an operator, and so on, can be stored in the data storage 22 as well. The number of raw material can be zero in case of raw material. The number of the assessment processes and environmental impacts must be equal to each other.

FIG. 5 shows an example of the data format of the data storage 22 for information in the disposal side, in which a product is broken down into "m" different kinds of breakdown matters. The data include a name of a product, a piece of information on the product, names of "m" kinds of breakdown matters, "n" number of assessment processes and "n" number of environmental impact levels, The information on the product is a kind of additional information including the number of products, the unit thereof, weight, volume, etc. The number of breakdown matters can be zero in case that the breakdown matters are to be incinerated or buried in the ground. The number of the assessment processes and environments impacts must be equal to each other.

In this embodiment, preferably, the manufacture side and disposal side have the same name of the product and the same information on the product, so as to assess environmental impact and to search any information easily.

Figure 6:
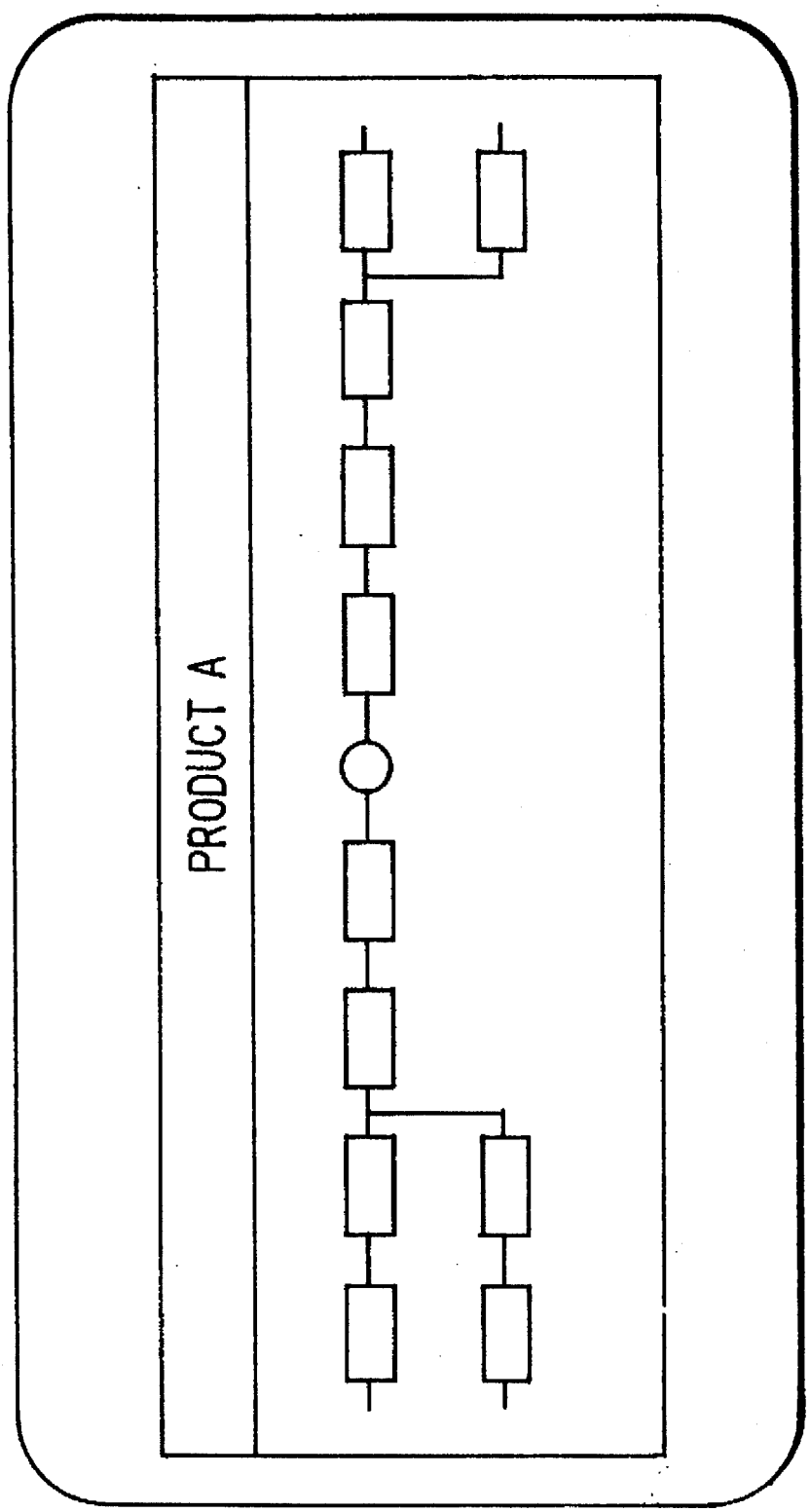
FIG. 6 is an explanatory diagram showing an example of output display, according to the invention.

FIG. 6 shows an example of display by the display unit in which the relation of assessment processes are displayed. The relation can be changed by an operator with the input unit 21 for improved operation.

FIG. 7 shows an example of display by the display unit 24, in which parts to be used for manufacturing a product A are displayed. In this display screen, any processes relating to the manufacture of the product A can be displayed. For this kind simple display, the environmental impact assessment unit 23 does not have to have a complicated structure of arithmetic circuit.

According to the invention, assessed values of environmental loadings impact are applicable to processing of a product efficiently. Errors of assessment for each assessment process can be monitored easily; and therefore, more precise assessment can be realized by changing an environmental impact value, which has been assessed accurately, for the following assessment. This invention is favorable especially for assessment of a product composed of a large number of parts, such as an electrical device, and mechanical device.

Although the invention has been described with respect to the specific embodiments for complete and clear disclosure, the appended claims are not to be thus limited but are to be construed as embodying all modification and alternative constructions that may occur to one skilled in the art which fairly fall within the basic teaching herein set forth.

What is claimed is:

1. A method for assessing environmental impact of manufacture and disposal of a product, comprising steps of:

dividing a life cycle of a product into a plurality of assessment steps;

structuring the life cycle of the product so as to have a tree structure defining the product as a root and each of said assessment steps as a branch extending from the root; and assessing environmental impact of each of said assessment steps.

2. The method according to claim 1, wherein said plurality of assessment steps include manufacture and disposal branch steps.

3. The method according to claim 1, further comprising a step of inputting predetermined assessment standards before the assessing steps.

4. The method according to claim 1, further comprising a step of displaying the impact of each step on an environment which has been assessed.

5. The method according to claim 1, wherein said assessing steps includes manufacturing branch steps including steps of providing raw material, transporting the raw materials, producing parts for the product, manufacturing the product and transporting the product.

6. The method according to claim 1, wherein said assessing steps includes disposing branch steps including steps of using the product, transporting the product, breaking down the product and disposing the breakdown.

7. A method for assessing environmental impact of manufacture and disposal of a product, comprising steps of:

inputting assessment standards on assessment steps;

dividing a life cycle of a product into a plurality of assessment steps in accordance with the assessment standards;

structuring assessment steps for manufacture so as to have a tree structure defining the product as a root and each assessment step as a manufacturing branch step extending from the root;

structuring assessment steps for disposal so as to have a tree structure defining the product as a root and each assessment step as a disposal branch step extending from the root;

assessing environmental impact of each assessment step;

calculating the total of the impact of the assessment steps; and displaying the environmental impact of each of said assessment steps and the total thereof, which have been assessed, wherein the manufacturing branch steps include providing raw materials, transporting the raw materials, producing parts for the product, manufacturing the product and transporting the product, and the disposal branch steps include using the product, transporting the product, breaking down the product into breakdown matters and disposing the breakdown matters.

* * * * *